United States Patent
Albers et al.

(10) Patent No.: US 7,707,303 B2
(45) Date of Patent: Apr. 27, 2010

(54) METHOD AND DEVICES FOR CONTROLLING RETRANSMISSIONS IN DATA STREAMING

(75) Inventors: Bastian Albers, Hamburg (DE); Uwe Horn, Aachen (DE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 310 days.

(21) Appl. No.: 10/526,807

(22) PCT Filed: Sep. 6, 2002

(86) PCT No.: PCT/EP02/10003

§ 371 (c)(1),
(2), (4) Date: Oct. 12, 2005

(87) PCT Pub. No.: WO2004/023706

PCT Pub. Date: Mar. 18, 2004

(65) Prior Publication Data

US 2006/0112168 A1    May 25, 2006

(51) Int. Cl.
*G06F 15/16* (2006.01)
(52) U.S. Cl. .................................... 709/231
(58) Field of Classification Search ............. 709/231, 709/232, 234, 235; 370/229
See application file for complete search history.

(56) References Cited

U.S. PATENT DOCUMENTS

| | | | | |
|---|---|---|---|---|
| 5,768,527 | A * | 6/1998 | Zhu et al. ................ | 709/231 |
| 6,085,252 | A * | 7/2000 | Zhu et al. ................ | 709/231 |
| 6,700,893 | B1 * | 3/2004 | Radha et al. ............. | 370/412 |
| 7,068,619 | B2 * | 6/2006 | Balachandran et al. ... | 370/328 |
| 7,099,273 | B2 * | 8/2006 | Ha et al. .................. | 370/229 |
| 7,139,241 | B1 * | 11/2006 | Gazit ....................... | 370/231 |
| 7,164,680 | B2 * | 1/2007 | Loguinov ................ | 370/394 |
| 2002/0004840 | A1 * | 1/2002 | Harumoto et al. ........ | 709/231 |
| 2002/0042836 | A1 * | 4/2002 | Mallory ................... | 709/232 |
| 2003/0018794 | A1 * | 1/2003 | Zhang et al. ............. | 709/231 |
| 2004/0199658 | A1 * | 10/2004 | Darshan et al. ........... | 709/232 |
| 2005/0198189 | A1 * | 9/2005 | Robinson et al. ......... | 709/217 |
| 2009/0100186 | A1 * | 4/2009 | Darshan et al. ........... | 709/231 |

FOREIGN PATENT DOCUMENTS

| EP | 1 130 839 A | 9/2001 |
|---|---|---|
| EP | 1 179 910 A | 2/2002 |

* cited by examiner

*Primary Examiner*—Saleh Najjar
*Assistant Examiner*—Jason Recek

(57) ABSTRACT

In a method for the transmission of a plurality of data packets from a sender (1) to a receiver (2), the data transmission is performed over a link (5) with a transmission capacity having a limit. A presentation time is defined for a first data packet of said plurality, and the receiver (2) performs a first check whether data packets are correctly received. At least one data packet is selected for retransmission according to the result of the first check. In the method, a delay budget (DB) is determined from the presentation time of the first data packet. Furthermore, a delay requirement is determined for the retransmission of the selected data packet from the limit of the transmission capacity and from the transmission capacity required for the selected data packet. A comparison (30) of the delay requirement and the delay budget (DB) is performed, and the retransmission is executed for the selected data packet according to the result of the comparison (30). Devices and software programs for executing the method are also described.

16 Claims, 3 Drawing Sheets

METHOD AND DEVICES FOR CONTROLLING RETRANSMISSIONS IN DATA STREAMING

TECHNICAL FIELD OF THE INVENTION

The present invention relates to streaming data between a sender and a receiver in a network over a link with a defined transmission capacity.

BACKGROUND OF THE INVENTION

Streaming applications are getting increasingly important, both in fixed networks like the Internet and in the context of $3^{rd}$ Generation mobile networks like UMTS (Universal Mobile Telephone System). Streaming technology allows a nearly instantaneous access for the users to pre-stored content without the necessity to transfer a complete file before presentation. Streaming applications are widely used for video and audio media.

In a streaming application, a stream of data packets is transmitted from a server being the original sender to a client as final receiver of the data packets. Packets may be lost during the transmission, e.g. due to transmission errors or due to dropping by congestion avoidance methods. Packets may also be delayed, for example due to link characteristics, link congestion and retransmissions of lost packets. Different individual delays for the packets result in a delay jitter within the packet stream. The data rate of a stream can also have variations due to the encoding of the media. For example, one option to transmit a video sequence is the transmission of differences between consecutive images. This leads to a high data rate in case of many differences while the data rate is low if several consecutive images are identical.

Each packet has a presentation time at which it must be available at the client for processing and presentation, e.g. for display in a video or audio sequence. Packets, which are lost or arrive too late, cannot be played out. As a consequence, streaming applications are sensitive both against packet loss and delays. Therefore, streaming clients generally have a buffer, which allows to compensate transmission delay jitter and the delay introduced by the retransmission of lost or erroneous data packets. Both the client memory required for buffering and the link bandwidth are however limited and expensive resources, especially in mobile applications. Therefore, they are often selected close to the minimum requirements for a desired quality of service.

The RTP (Real-Time Transport Protocol) protocol allows an efficient delivery of data packets for real-time media like audio or video files. RTP is transported on UDP (User Datagram Protocol), which does not include a retransmission mechanism for the recovery of lost or corrupted packets. Therefore, a retransmission mechanism on top of RTP is required to compensate packet losses. The RTCP (RTP control protocol) specifies a data packet format that can be used to implement such a retransmission mechanism. The retransmission control method is not specified in RTCP to allow adaptations to individual applications. Different retransmission control methods for the RTP protocol are therefore possible based on the RTCP data packet format.

One example of a retransmission method is described in U.S. Pat. No. 6,275,471 When a receiver receives a stream from a sender after an according request, the receiver checks whether there are any lost data packets. If this is the case, the receiver determines a remaining transmission period for the lost data packet, i.e. the latest time at which the packet needs to be available at the receiver for presentation. The remaining transmission period is sent with the negative acknowledgement for the lost data packet to the sender. The sender compares the remaining transmission period with an estimated round-trip time to check whether the requested packet can arrive at the receiver before the required presentation time. If this is the case, the retransmission is performed. Else, the packet is not retransmitted and the receiver constructs the output of the application without the lost packet, e.g. by using error concealment techniques.

Between the server and the client, the data packets are transported by one or several transport networks, typically over a plurality of links with different characteristics. Often, one of said links is a bottleneck for the transmission as it has the lowest data rate and/or a high round trip time, the latter influencing especially the delay of retransmissions. In wireless communication systems, the bottleneck is generally the wireless link to a mobile user equipment, e.g. a mobile phone. European application EP 1 130 839 describes an option to calculate the transmission delay of data packets.

On a link with limited bandwidth, self-congestion may occur. If data packets are retransmitted, the server has to ensure that the total traffic comprising both original packets and retransmitted data packets does not exceed an allowed or guaranteed bitrate. Due to the limitation, original data packets are often delayed when a retransmission is performed, especially if the data rate of the original data packets is close to the link capacity. This delay can disturb the presentation behavior of the data stream by the streaming application, which may be interrupted or may need to apply error correction or concealment.

The data rate may vary considerably for some types of links, e.g. according to the behavior of other users sharing the same resources, while other links provide a constant or nearly constant bandwidth for transmission. For example, UMTS streaming bearers transporting the data packets to mobile clients can be negotiated for specific combinations of guaranteed bitrate, packet loss, and delay for the data packets. Many streaming applications allow an adaptation of the stream to guaranteed parameters, e.g. by selecting the rate of original data below the guaranteed bitrate, allowing a rate of retransmissions according to the difference of selected and guaranteed bitrate. A gateway, e.g. a 3G-GGSN (Gateway GPRS Support Node) in the example of a UMTS system, controls the traffic from the server to the client using a traffic policing function. If the traffic exceeds the guaranteed parameters, packets can be dropped. This can lead to a severe disturbance of the stream presentation, especially if retransmissions increase the bitrate of the stream beyond a guaranteed bitrate.

SUMMARY AND DESCRIPTION OF THE INVENTION

It is an object of the present invention to obviate the above disadvantages and provide a method and devices for controlling retransmissions in data streaming which reduce the disturbance of the receiving application by delayed or dropped data packets. It is a further object, to allow a high utilization of the available bandwidth for the transmission. It is still another object to perform the retransmission control with low complexity.

In a method for the transmission of a plurality of data packets from a sender to a receiver, the data transmission is performed over a link with a limited transmission capacity. Sender and receiver need not to be the origin and final destination of the transmission but may also be intermediate entities, e.g. proxies. The method can most easily be implemented if the limit of the transmission capacity is constant or if changes in the limit can easily be predicted, e.g. due to slow variations or information from other protocol entities in the transmission.

The receiver performs a first check whether data packets are correctly received. For example, the receiver can check whether packets are completely missing by using packet sequence numbers or it can determine from redundant information in the data packet, e.g. from a CRC (cyclic redundancy check), whether a packet is erroneous due to transmission errors. At least one data packet is selected for retransmission according to the result of the first check, i.e. the packet is selected if it is erroneous or missing.

A presentation time is defined for a first data packet of said plurality. Typically, the plurality of data packets for transmission is a packet stream although the method is generally applicable if a presentation time is defined for packets transmitted over a link. The presentation time corresponds to the latest time when the first data packet must arrive at the receiver to be processed and, in case of the final receiver in a transmission, presented by the application. The presentation time can for example be indicated in a data field in a protocol header of said packet or in control information sent with a stream. In most cases, presentation times are defined for all data packets in the plurality.

Throughout this specification, packets transmitted for the first time are denoted original packets. Original packets and retransmissions are not necessarily identical, e.g. if a protocol allows to retransmit only those sections of an original packet which were erroneous. It is also possible, that a retransmission is detected as missing or erroneous and selected for a further retransmission. Both the first data packets and the selected data packet can therefore be an original transmission or a retransmission.

From the presentation time of the first data packet, a delay budget is determined. The delay budget indicates a transmission capacity, which can be attributed to retransmissions without delaying the first data packet beyond the presentation time. Furthermore, a delay requirement is determined for the retransmission of the selected data packet. The delay requirement is calculated from the limit of the transmission capacity and from the transmission capacity required for the selected data packet, i.e. the delay requirement is calculated under the assumption that the retransmission is performed using the limit of the transmission capacity.

A comparison of the delay requirement and the delay budget is performed. The retransmission of the selected data packet is executed according to the result of the comparison, i.e. the selected data packet is only retransmitted if the delay budget is at least equal to the delay requirement while the retransmission is else cancelled.

Typically, the limit of the transmission capacity corresponds to a maximum data rate. However, other or further resources relating to the transmission capacity can be considered in the comparison, e.g. processing capacities of the sender or the receiver. The delay requirement generally corresponds to a packet size of the selected data packet. The comparison with the delay budget is in this case preferably performed for the packet size divided by the limit of the transmission rate.

Although the method and the involved comparison are described throughout this specification according to the time required for transmission, it should be noted that equivalent representations exist. For example, in case of a constant data rate, it is equivalent to determine the delay budget as an allowable number of data blocks of a lower protocol layer or bytes or bits and compare the size of the selected data packets to the delay budget determined in this way.

The basic idea of the proposed method is a retransmission control, which avoids the problem of self-congestion caused by retransmissions when transmitting over a bottleneck link. The method avoids buffer underflows while allowing an implementation with low complexity. It is especially suitable for data streaming like it is performed for example in mobile multimedia applications. For this case, the method takes advantage of the fact, that a variable rate encoded stream does not always utilize the full capacity of the link. Especially, the perceived quality of the application output is considerably improved because interruptions of the data stream are avoided. The method may be implemented in the server or in the client. To improve the performance on a connection, one option is to divide it on one or both ends of a bottleneck link by a proxy. In this case, it can also be advantageous to implement the method in the proxy being an intermediate sender and receiver in the data transmission.

In a preferred embodiment of the method, the receiver stores data packets in a buffer with a buffer fill level varying over time. In this case, the delay budget is a function of the buffer fill level and calculated with respect to the buffer fill level. A buffer generally has a predetermined buffer size corresponding to the maximum fill level and thus to the maximum delay budget. Preferably, the transmission is controlled in such a way that the fill level is close to the buffer size in order to maximize the delay budget.

Preferably, the delay budget is determined for several first data packets, i.e. for a group comprising at least two first data packets. In this way, the delay budget can consider all first data packets, which may be delayed by the retransmission of the selected data packet. One simple option in this case is to calculate first an individual-delay budget for every first data packet in the group and determine then the delay budget as the minimum of the individual delay budgets.

The delay budget preferably considers the presentation times for all first data packets, which may be delayed by retransmissions. On the other hand, the processing effort increases with the number of data packets in the group considered for the delay budget. If the first data packets are transmitted in a predefined sequence, it is therefore advantageous to select only those data packets for the group of considered packets, which are the next data packets for transmission in said sequence. Either a certain number of packets can be considered or a criterion is defined for stopping the selection. An advantageous stopping criterion is to finish the selection of data packets for the group if the delay budget will remain constant for any further packets. For a limited buffer size, it is generally possible to stop the calculation of the delay budget without loss of information when the transmission of the packets in the group at the limit of the transmission capacity reaches the limited buffer size. Consideration of further data packets does not affect the delay budget and the selection of data packets for the group can therefore be stopped.

The method is advantageous if the receiver requests the selected data packets in a status message. In this case, the method can either be implemented in the receiver to control the sending of status messages or in the sender to control whether and which retransmissions are performed in reply to a status message.

When the method is used, several data packets can be selected for retransmission, i.e. the selected data packet and at least one further data packet. Therefore, the delay budget is preferably reduced by the delay requirement if a retransmission of a data packet is performed. The reduction allows a simple adaptation of the delay budget for further comparisons relating to the further data packets selected for retransmission. In this case, a new delay budget is only calculated from the presentation times of the first data packets if the adapted delay budget is not sufficient for a further delay requirement. Alternatively, a new delay budget can be calculated from the presentation times of the first data packets for every further comparison. However, the latter approach generally requires more processing capacity.

If the delay budget is adjusted according to the performed retransmissions, it is advantageous to perform a further calculation of the delay budget from the presentation times of the first data packets after a further comparison of the delay budget with a further delay requirement. This allows a reduction of the processing effort for determining a delay budget for any further retransmissions.

Generally, the calculation of the delay budget assumes that data is transmitted at the limit of the transmission capacity. However, the present data rate may be subject to further constraints, e.g. temporary constraints by the transmission system due to prioritized traffic or due to a lower transmission rate by the sender to accommodate for a limited buffer size of the receiver. Therefore, the delay budget is preferably adapted if a present rate of the data transmission is lower than the limit of the data transmission capacity.

It is possible to extend the method by utilizing additional information about the data packets to optimize the overall performance of the application in the presence of packet losses. For this purpose, a priority is preferably attributed to a first or selected data packet and the retransmission is executed according to said priority. For example, information affecting the presentation of a high number of subsequent frames may have a higher priority in a streaming application. The priority may be considered in different steps of the method, e.g. it can be considered in the first check, in the determination of the delay budget, in the determination of the delay requirement, in the comparison of delay requirement and delay budget, or for initiating a retransmission. For example, it can be avoided that an original transmission with low priority blocks a retransmission with high priority by setting the delay requirement for the retransmission to zero or by omitting packets with low priority from the calculation of the delay budget. In another example, a retransmission of a packet with low priority can both be avoided by not selecting it in the first check and by skipping the execution of the retransmission after the comparison. In the comparison, adjusting parameters can be used according to the priorities. This embodiment of the method is especially advantageous in a server because the priorities need not to be transmitted to the receiver in this case.

If priorities are specified according to the application content, it can also be indicated that packet losses are more acceptable at certain positions in a data stream, e.g. at scene cuts or during still images of a video. It is then possible to skip the proposed method for packets sufficiently close to the acceptable position, e.g. by setting the delay requirement for all those data packets to zero, which are closer to the acceptable position than one or two round trip times of the transmission. In this way unavoidable losses and re-buffering events can be shifted to positions in the packet stream for which the impact on the perceived quality is minimized.

Preferably, in a further check a presentation time for the selected data packet is compared to an estimated arrival time of the selected data packet at the receiver. The retransmission of the selected data packet is performed according to the result of the further check. Correspondingly, retransmissions of those data packets can be avoided, which would arrive too late at the receiver for processing.

A preferable sender for the transmission of a plurality of data packets to a receiver has a transmission unit for sending the data to the receiver. The data transmission can be performed over a link with a transmission capacity having a limit. Furthermore, the sender has a receiving unit for receiving an indication whether the receiver did correctly receive the data packets. A processing unit is connected to the transmission unit and the receiving unit, typically integrated in a transceiver, and processes transmitted and received data packets. Especially, the processing unit can define a presentation time for a first data packet of said plurality, e.g. by extracting a corresponding data field from a header of the first data packet. In addition, the processing unit can select at least one data packet for retransmission according to a received indication.

From the presentation time of the first data packet, the processing unit determines a delay budget. Furthermore, the processing unit determines a delay requirement for the retransmission of the selected data packet from the limit of the transmission capacity and from the transmission capacity required for the selected data packet. The processing unit is adapted to perform a comparison of the delay requirement and the delay budget and to initiate the retransmission for the selected data packet according to the result of the comparison, i.e. to initiate it only if the comparison indicates a sufficient delay budget for the retransmission.

A receiver for the reception of a plurality of data packets from a sender has a reception unit for receiving the data packets. The data packets are transmitted over a link with a transmission capacity having a limit. A transmission unit of the receiver can send indications whether data packets are correctly received. A processing unit is connected to the transmission unit and the reception unit, performs a check, whether data packets are correctly received, and selects at least one data packet for the indication according to the result of said check. The processing unit is also adapted to define a presentation time for a first data packet of said plurality.

In addition, the processing unit is adapted to determine a delay budget from the presentation time of the first data packet. The processing unit also determines a delay requirement for the retransmission of the selected data packet from the limit of the transmission capacity and from the transmission capacity required for the selected data packet. The processing unit performs a comparison of the delay requirement and the delay budget and selects the data packet for the indication according to the result of the comparison, i.e. a data packet is only included in the indication if it is both not correctly received and the delay budget allows a retransmission.

Both the sender and the receiver may be adapted to any embodiment of the above method. The method can also be implemented by a software program unit comprising code for performing the steps of the method when executed in the processing system of a client, a server or a proxy. The program unit is for example stored on a data carrier or loadable into the processing system, e.g. as a sequence of signals. It may be part of a software packet including further software units.

The foregoing and other objects, features and advantages of the present invention will become more apparent in the following detailed description of preferred embodiments as illustrated in the accompanying drawings.

DETAILED DESCRIPTION OF PREFERRED EMBODIMENTS OF THE INVENTION

Figure 1:
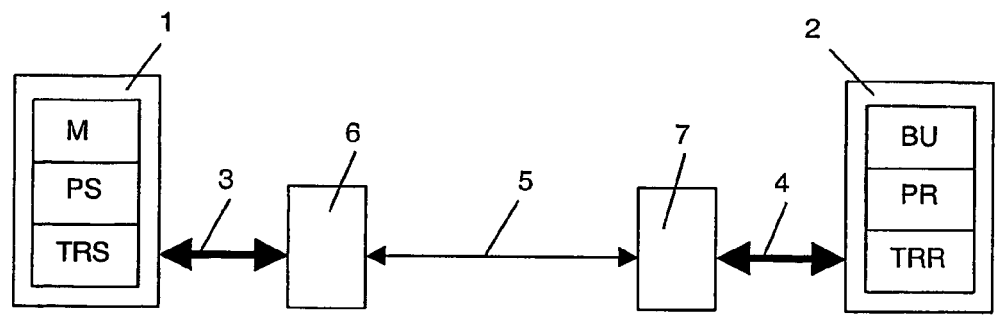
FIG. 1 shows a data transmission from a server to a client

FIG. 1 depicts a data transmission from a server being the sender 1 of the data packets to a client being the receiver 2 for the sent packets. The transmission is performed over one or more links 3-5, which are for example connections in a communication system. Typically, one of the links is a bottleneck link 5 with a low rate of data transmission. Optionally, the performance of the transmission is improved by one or two proxies 6, 7 at the ends of the bottleneck link 5. In this case, the proxies 6, 7 can be intermediate senders and receivers in the transmission.

The sender 1 has a memory M, in which the content for transmission is stored and from which it is retrieved and processed by a processing unit PS before transmission to the receiver 2 by a transceiver unit TRS. Also the receiver 2 is provided with a transceiver unit TRR for decoding the received data packets and forwarding them to a processing unit PR, which processes the content for presentation to a user. A buffer BU in the receiver allows a temporary storing of the content to compensate for variations in the transmission rate. According units can also process the data in the optional proxies 6, 7 and are omitted in the figure only for simplification.

Figure 2:
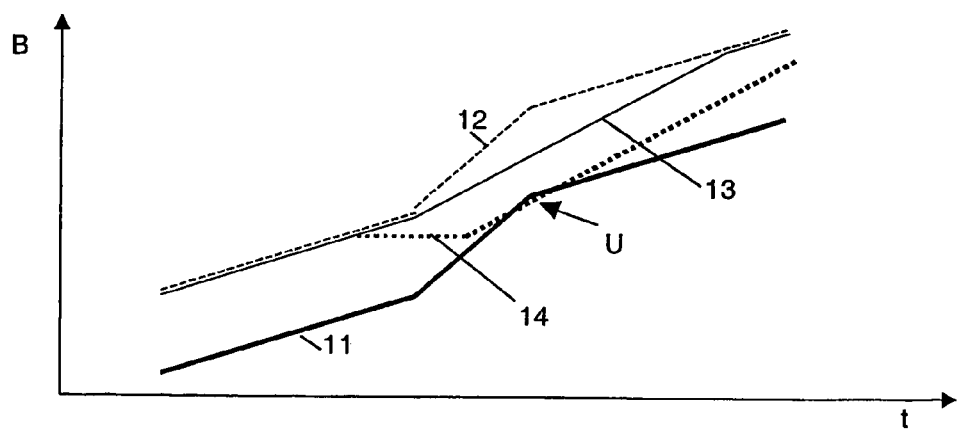
FIG. 2 shows a buffer underflow caused by retransmissions when streaming over a bottleneck link

FIG. 2 illustrates the underlying problem of a protocol performing retransmissions over a link with limited bandwidth. The figure represents the accumulated data, i.e. the total number B of bytes, transmitted over time t. Presentation line 11 corresponds to the total amount of data, which needs be transmitted to the receiver at any time to allow a smooth presentation of the media. If less data is available at a certain time, i.e. in case of a client buffer underflow, no data is present for the continuous presentation. The presentation has to stop until further data is transmitted and available, i.e. until a re-buffering took place.

Generally complete data packets are processed and forwarded for processing to the application. Therefore, presentation line 11 corresponds to a sequence of discrete points in time when the last data block of every packet has to be available at the receiver. For simplicity of representation, these points are represented by the connecting presentation line 11.

A streaming client usually buffers more data than required for smooth presentation to be able to compensate small fluctuations in the link throughput. Normally, the available buffer space is limited, especially when memory is expensive as it is the case in mobile terminals. The upper limit 12 in the amount of data, which can be stored by the client, is shown in FIG. 2 by a broken line. Upper limit 12 is a vertically shifted copy of the presentation line 11. The shift between presentation line 11 and upper limit 12 corresponds to the buffer size. Data has to be discarded in case of a buffer overflow, i.e. if the client, due to limited buffer size, cannot store data transmitted by the sender.

To avoid both a buffer underflow and an overflow, the server sends the data packets according to a transmission plan 13, which is calculated to keep the accumulated data between presentation line 11 and upper limit 12. As long as the data follows the transmission plan 13, neither a buffer underflow nor a buffer overflow occurs. The server can determine the transmission plan 13 because both the client buffer size and the presentation line 11 are known. The client buffer size is often negotiated during session setup while presentation line 11 is a function of the content stored at the server. Preferably, the transmission plan 13 corresponds closely to the upper limit 12 of the buffer to allow for transmission variations or a temporary link disruption, especially for wireless transmission.

Due to retransmitted packets, the scheduling of the original data can be delayed. This is indicated in FIG. 2 by doted line 14. During the horizontal section of line 14, the transmission of original data packets is suspended and retransmissions are performed instead. The delay may cause an immediate buffer underflow or it may result in an underflow U at a later time. This is due to the fact that the maximum transmission rate, corresponding to the maximum slope of transmission plan 13, is limited. Presentation line 11 may have temporarily a steeper slope than the maximum transmission rate and the transmission of a consecutive data packet may still be incomplete at presentation time. In this case, data packets arrive at the client after the required presentation time.

The proposed method allows to avoid disturbances by retransmissions, especially buffer underflows and according re-buffering events, when streaming over a bottleneck link. The basic idea is a prediction of the future transmission behavior, which allows the server to retransmit packets only in those cases, in which the retransmission does not result in an immediate or future buffer underflow. In particular, the described method allows an implementation with low complexity at the server. This is especially advantageous for the processing of high data volumes and increases the number of streams, which the server can process simultaneously.

Figure 3:
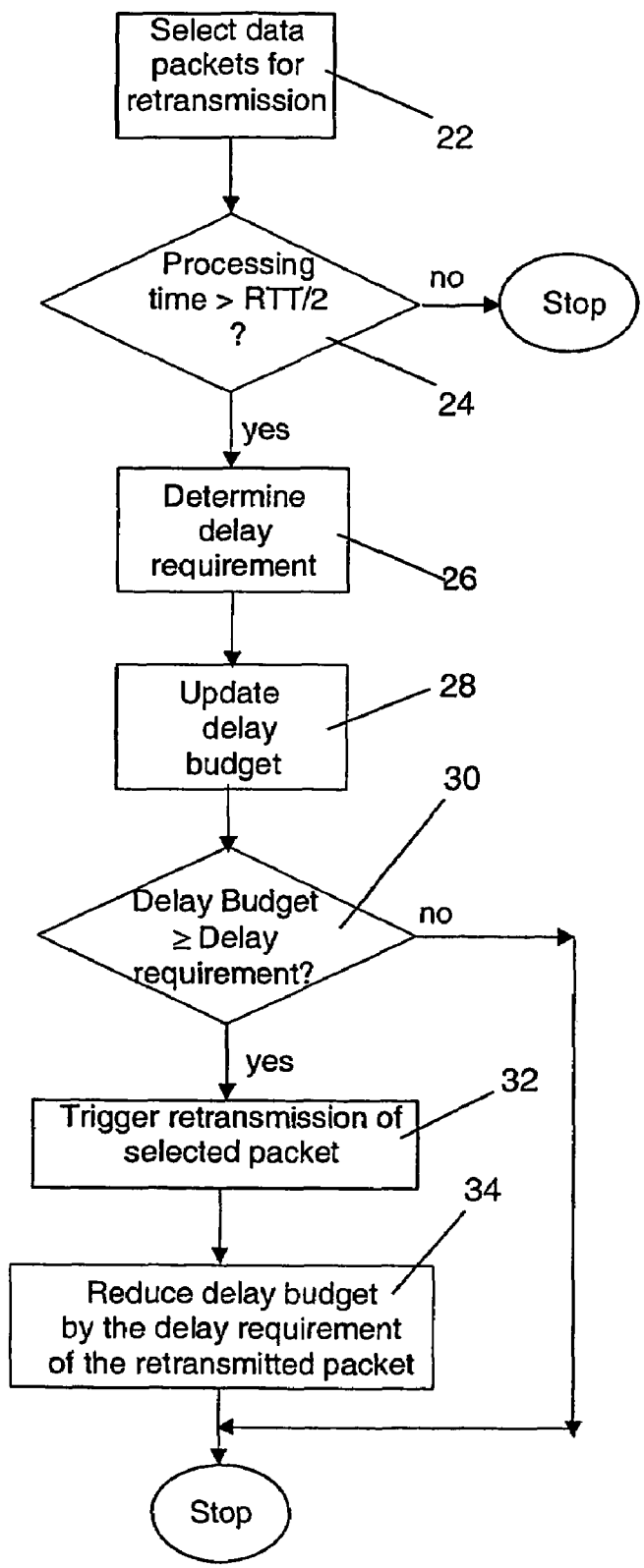
FIG. 3 shows a flow chart of a retransmission method according to the invention

FIG. 3 shows an example of the retransmission control method. For the retransmissions, a delay budget is computed and managed. The delay budget indicates the amount of time by which original data packets can be delayed without resulting in a buffer underflow, i.e. whether a particular retransmission will cause a buffer underflow.

The flowchart illustrates an implementation of the method in the server. In selection 22, a data packet is selected for retransmission, e.g. according to a request received from the client. After selection 22 of a packet, an optional check 24 is performed whether the retransmission can arrive at the client before the presentation time required for the scheduled presentation by the client application. Preferably, a retransmission is only performed if the check 24 indicates that the latest presentation time is later than the estimated time for sending out the retransmission plus the time required for the transmission procedure. The presentation time can be indicated in the request for retransmission or may be determined according to the presentation information at the sender while the value of the required time for transmission can be estimated, e.g. as a half measured round trip time between client and server, or it can be pre-configured. If the retransmission will not arrive in time, the processing for the selected packet is stopped. The transmission resources can then be used for other packets in the same stream, especially new original data packets, or they may be used by other senders sharing the same resources.

For the selected data packet, a determination 26 of the delay requirement for the retransmission is performed. In the embodiment of FIG. 3, an update procedure 28 of the delay budget follows subsequently. In update procedure 28, a new delay budget is calculated according to the presentation times of the next unsent data packets and the maximum data rate as described in more detail below. After the update procedure 28, a comparison 30 of the delay budget and the delay requirement is executed. If the delay budget is at least equal to the delay requirement, i.e. sufficient for the retransmission, an initiation 32 of the retransmission and a reduction 34 of the delay budget by the delay requirement of the retransmitted data packet are performed. Else the process is stopped without retransmission. The time of initiation 32 may differ from the actual transmission of the selected data packet, e.g. to the scheduling of other data packets.

Any new calculation of the delay budget requires considerable processing effort. In an advantageous alternative to the method depicted in FIG. 3, a first comparison between the delay budget and the delay requirement is performed before an update procedure of the delay budget. If the last calculated delay budget is at least equal to the delay requirement, i.e. still sufficient for the retransmission, update procedure 28 is omitted and the initiation 32 of the retransmission as well as the corresponding reduction 34 of the delay budget is immediately performed. If the delay budget is smaller than the delay requirement, update procedure 28 is executed and a further comparison 30 of the delay budget is performed. The retransmission is then initiated or omitted according to the result of the further comparison. In spite of the repeated comparison of the delay budget, this implementation is more efficient in most cases because said comparison requires a low processing effort.

Apart from the update procedure 28, it should be noted that also the sequence of several other steps in the above method may be altered. For example the sequence of initiation 32 and reduction 34 may be reversed, or the determination 26 of the delay requirement can be performed at any time until comparison 30 is executed. Furthermore, although the flowchart describes the process for a single data packet, it is often more preferable to select more than one data packet in step 22. In this case, the steps of the method must be repeated for every data packet except update procedure 28, which is preferably only repeated when a comparison 30 disallows a retransmission.

Alternative to an implementation in the server as described in FIG. 3, the method can be also implemented in the client if the information necessary to calculate the delay budget is transmitted to the client. In this case, the client compares delay budget and delay requirement before it requests a retransmission from the server. If a retransmission will cause a future buffer underflow, the retransmission request is cancelled, i.e. the request is not sent or the request is omitted from a message requesting several packets. An implementation at the client has the advantage of a reduced complexity at the server, which generally processes many data streams in parallel and therefore typically has a much higher processing load. In addition less traffic is sent in uplink direction from client to server since unnecessary retransmission requests are avoided. A disadvantage of this solution is the required transmission of information to the client, which needs to be performed at least in part prior to the start of the data packet transmission. This can increase the session setup delays. Furthermore, extensions to existing protocols are required to allow transmission of such information. The more advantageous alternative depends therefore on the protocol and implementation.

A central part of the proposed method is the computation of the delay budget. With respect to FIGS. 4 and 5, a preferable example for the computation of the retransmission delay budget is described. In the description, it is assumed that a stream is encoded at a variable rate and transmitted at a constant rate over a bottleneck link while the size of the client buffer is limited.

The transmission of a packet stream requires a scheduling for the data packets, which ensures that neither the data rate of the bottleneck link nor the client buffer size is exceeded. Typically, the size of the data packets can vary. Equation (1) specifies the time $t_n$ at which an original data packet n can be sent. $t_n$ is determined by the time $t_{n-1}$ at which the previous original data packet was sent, the data rate R of the bottleneck link in bits per second, and the size $s_{n-1}$ of the previous packet in bytes, assuming 8 bits in a byte, as $$t_n = t_{n-1} + \max\left(\frac{8 * s_{n-1}}{R}, \delta\right). \quad (1)$$

$\delta$ is a function of the buffer size and denotes the waiting time required to avoid a buffer overflow. During waiting time $\delta$, data needs to be scheduled at a lower rate than R. If this is not the case, i.e. if $$\frac{8 * s_{n-1}}{R} < \delta,$$

the client buffer exceeds its maximum unless data packets are delayed or dropped.

Figure 4:
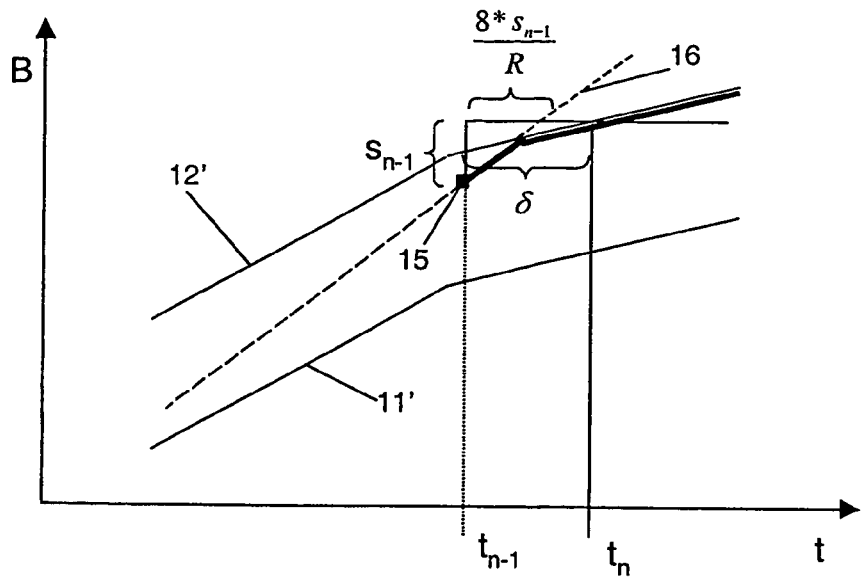
FIG. 4 shows the computation of the earliest sending time $t_n$ for a data packet n

An example for this case is depicted in FIG. 4 showing the accumulated data over time with presentation line 11' and upper limit 12' of the buffer as described with respect to FIG. 2. When at time $t_{n-1}$, data is transmitted at the capacity limit, the upper buffer limit 12' will be exceeded starting from point 15 as indicated by broken line 16. Therefore, the scheduling of the next transmission time $t_n$ is shifted to time $t_{n-1}+\delta$, i.e. the function max in equation (1) selects the maximum of $$\frac{8 * s_{n-1}}{R}$$

and $\delta$.

A computation of a new delay budget at a given time $t_s$ requires an analysis of the future presentation behavior, i.e. of the presentation line, in comparison to the maximum data rate of the bottleneck link. The analysis is possible since all relevant information is available from the streaming application, in particular the latest presentation time of the subsequent original data packets. A new computation of the delay budget is necessary when the current delay budget is not large enough to allow retransmissions of missing or erroneous data packets.

Figure 5:
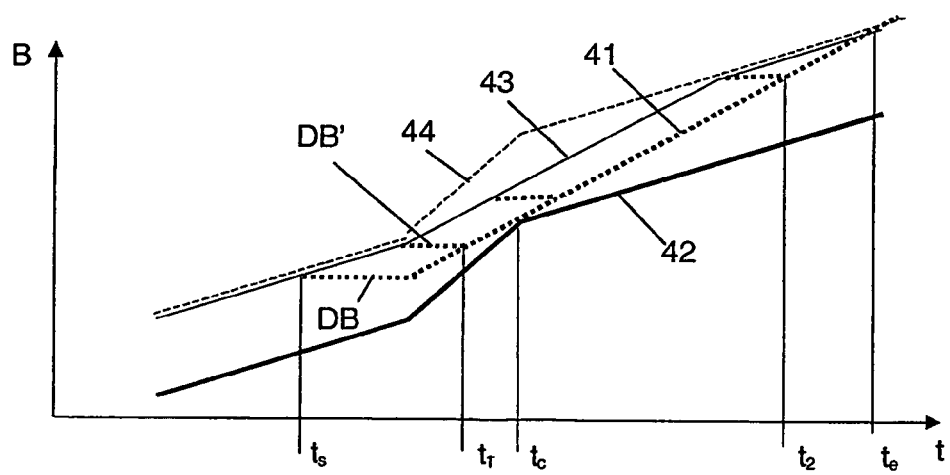
FIG. 5 shows an example of computing the delay budget for retransmissions

With respect to FIG. 5, the computation of the delay budget for a specific time $t_s$ is explained in more detail. The delay budget at time $t_s$ assumes a maximum rate transmission plan 41, which schedules data at the maximum rate of the bottleneck link. The maximum rate transmission plan 41 is then inserted into the graph such that it touches the presentation line from above without intersecting it. In FIG. 5 this is the case at time $t_c$. The horizontal distance between the original transmission plan 43 at $t_s$ and the maximum rate transmission plan 41 is the delay budget DB by which the actual transmission plan can be delayed in time without resulting in a future buffer underflow.

If the present transmission rate is lower than the maximum rate, an update of the delay budget is required. For example, between times $t_s$ and $t_1$, the delay budget decreases compared to $t_s$ since data is transmitted at a lower rate than the maximum data rate to avoid an overflow of the client buffer, which is already filled to the upper limit. Therefore, in this region the delay budget needs to be updated continuously until a reduced delay budget DB' is attained at time $t_1$. In contrast, between times $t_1$ and $t_2$ the delay budget DB' remains constant since the original transmission plan 43 sends data at the maximum data rate to fill up free buffer space created by the presentation rate exceeding the maximum transmission rate in the interval before $t_c$. Correspondingly, the distance between the original transmission plan 43 and the maximum rate transmission plan 41 is constant. Between $t_2$ and $t_e$ the delay budget needs again to be updated continuously since also in this region the original transmission plan is not transmitting at full speed. The update procedure reduces the current delay budget by the difference between actual and maximum transmission rate multiplied by the duration of the lower transmission rate.

It should be noted that reductions of the calculated delay budget after time $t_2$ result from the fact that a new calculation of the budget is avoided to save the required processing effort. The actual delay budget increases again after time $t_c$ because the presentation rate is lower than the maximum transmission rate. If, after time $t_c$, the retransmission of a data packet requires a higher delay budget than the calculated delay budget DB+, a new calculation of the delay budget as described for $t_s$ can be performed. This increases the delay budget to the actual present value.

More formally, an update of the delay budget is required at time $t_{n-1}$ if $$\frac{8*s_{n-1}}{R} < \delta$$

with the variables as defined with respect to equation (1). In this case, the updated delay budget is $$\text{delay\_budget} = \text{delay\_budget} - \left(\delta - \frac{8*s_{n-1}}{R}\right) \quad (2)$$

After a retransmission was sent, the delay budget needs to be reduced by the delay caused by the retransmission, i.e. by the delay requirement. If $s_r$ denotes the size of the retransmitted packet, the delay requirement for the retransmission is $$\frac{8*s_r}{R}$$

and the delay budget needs to be updated according to $$\text{delay\_budget} = \text{delay\_budget} - \frac{8*s_r}{R}. \quad (3)$$

When the transmission plan 41 at maximum rate intersects the upper buffer limit 44 at time $t_e$, the calculation of the delay budget can be stopped. Any data packet, which is transmitted after $t_e$ can not influence the delay budget because the limited buffer does not allow a higher buffer level.

Simulations of the proposed method were carried out with a variable rate encoded video stream having a mean data rate of 59 kbps and a bottleneck link rate of 65 kbps for a client buffer size of 32 Kbytes and an initial buffering time of 1.7 sec. A network round-trip-time of 400 ms was assumed. The parameters allow a smooth playback of the application under customary operating conditions.

| | Retransmission Control | | | | |
|---|---|---|---|---|---|
| | Number of packets | Lost packets | Sent retransmissions | Retransmissions delivered in time | Delayed packets |
| State of the art | 782 | 78 | 47 | 47 | 51 |
| Proposed method | 782 | 78 | 45 | 45 | 0 |

The table compares the proposed retransmission mechanism compared with a method according to the state of the art. In both cases 78 of 782 transmitted packets were lost, corresponding to a packet loss probability of approximately 10%.

The retransmission mechanism according to the state of the art retransmits 47 of the 78 lost packets, all of them arriving at the client in time. The remaining, packets are not retransmitted as they would arrive too late. However, since self-congestion is not taken into account, 51 original packets of the data stream arrive at the client too late, being delayed by the retransmissions. The delayed packets cannot be used for the presentation and are dropped.

The present method retransmits 45 of the lost packets, all of them arriving in time. Due to the analysis of the impact of the retransmissions on the future presentation behavior, no packets of the original data are delayed beyond the presentation time. It should be noted that the number of retransmissions is only marginally smaller compared to the state of the art because unnecessary transmissions of original packets are totally avoided. As a result, only a total of 33 data packets are lost to the application while in the state of the art 82 packets, i.e. 51 delayed original packets and 31 delayed retransmissions, are lost for the application.

The above embodiments admirably achieve the objects of the invention. However, it will be appreciated that departures can be made by those skilled in the art without departing from the scope of the invention which is limited only by the claims.

The invention claimed is:

1. A method comprising a server for retransmitting a plurality of data packets from a sender to a receiver in a telecommunications network, wherein the data transmission is performed over a link having limited transmission capacity, and a presentation time is defined, for a first data packet of said plurality, as corresponding to the latest time when the first data packet of said plurality must arrive at the receiver to be processed and presented by an application, wherein the receiver performs a first check whether data packets are correctly received and selects a further data packet for retransmission according to the result of the first check;

determining a delay budget from the presentation time of the first data packet, the delay budget indicating a transmission capacity available for data packet retransmissions without delaying the first data packet beyond the presentation time;

determining a delay requirement for the retransmission of the selected data packet from the limit of the transmission capacity and from the transmission capacity required for the selected data packet;

comparing the delay requirement and the delay budget; and retransmitting the selected data packet if the delay budget is at least equal to the delay requirement, otherwise cancelling the retransmission of the data packet.

2. The method according to claim 1, wherein the receiver stores data packets in a buffer with a buffer fill level and wherein the delay budget is a function of the buffer fill level.

3. The method according to claim 1, wherein the delay budget is determined from the presentation times for each of a group comprising at least two first data packets.

4. The method according to claim 3, wherein the at least two first data packets of the group are to be transmitted in a predefined sequence, and wherein additional data packets are to be added to the group, which are the next data packets for transmission in the predefined sequence, and wherein the adding of additional data packets to the group is stopped if the delay budget is expected to remain constant for further additional packets.

5. The method according to claim 1, wherein the receiver requests retransmission of the at least one data packet in a status message transmitted to the sender.

6. The method according to claim 1, wherein the delay budget is reduced by the delay requirement if a retransmission is performed.

7. The method according to claim 6, wherein a further comparison of the delay budget with a further delay requirement is performed before a further calculation of the delay budget.

8. The method according to claim 1, wherein the delay budget is updated if a present rate of the data transmission is lower than the limit of the data transmission capacity.

9. The method according to claim 1, wherein a priority is attributed to the at least one selected data packet and wherein the retransmission is executed according to said priority.

10. The method according to claim 1 wherein a presentation time for the at least one selected data packet is compared to an estimated arrival time of the selected at least one data packet at the receiver in a further check, and wherein the retransmission of the selected at least one data packet is performed according to the result of the further check.

11. The method of claim 1, wherein the delay budget is computed as $$t_n = t_{n-1} + \max(8 \ast s_{n-1}, \sigma)/R;$$

where $t_n$ is when an original data n can be sent and is determined by the time $t_{n-1}$ at which the original data packet n was sent, R is the data rate of a bottleneck link in bits per second, and size $s_{n-1}$ of the previous packet in bytes and $\sigma$ denotes waiting time required to avoid buffer overflow.

12. The method of claim 1, wherein the delay budget indicates the amount of time by which the first data packet can be delayed without resulting in a buffer underflow.

13. A sender in a network for transmitting a plurality of data packets to a receiver, the sender comprising:
a transmission unit for transmitting data over a link having a limited transmission capacity;
a means for receiving an indication whether data packets are correctly received by the receiver; and
a processing unit for:
defining a presentation times, for a first data packet of said plurality, as corresponding to the latest time when the first data packet of said plurality must arrive at the receiver to be processed and presented by the application, and selecting a data packet for retransmission according to the indication;
determining a delay budget from the presentation time of the first data packet, the delay budget indicating a transmission capacity available for data packet retransmissions, without delaying the first data packet beyond the presentation time;
determining a delay requirement for the retransmission of the selected data packet from the limit of the transmission capacity;
performing a comparison of the delay requirement and the delay budget; and
retransmitting the selected data packet if the delay budget is at least equal to the delay requirement, otherwise cancelling the retransmission of the data packet.

14. The sender of claim 13, wherein the delay budget is computed as $$t_n = t_{n-1} + \max(8 \ast s_{n-1}, \sigma)/R;$$

where $t_n$ is when an original data n can be sent and is determined by the time $t_{n-1}$ at which the original data packet n was sent, R is the data rate of a bottleneck link in bits per second, and size $s_{n-1}$ of the previous packet in bytes and $\sigma$ denotes waiting time required to avoid buffer overflow.

15. A receiver in a network for the reception of a plurality of data packets from a sender, the receiver comprising:
a reception unit for receiving the plurality of data packets over a link having a limited transmission capacity;
a transmission unit for sending an indication whether data packets are correctly received; and
a processing unit for:
determining a presentation time, as corresponding to the latest time when the first data packet of said plurality must arrive at the receiver to be processed and presented by the application, of a first data packet to be transmitted over the link with a limited transmission capacity,
performing a check of whether data packets are correctly received,
determining a delay budget from the presentation time of the first data packet, the delay budget indicating a transmission capacity available for data packet retransmissions without delaying the first data packet beyond the presentation time;
determining a delay requirement for retransmission of a selected data packet from the limit of the link's transmission capacity and from the transmission capacity required for the selected data packet,
performing a comparison of the delay requirement and the delay budget, and
retransmitting the selected data packet if the delay budget is at least equal to the delay requirement, otherwise cancelling the retransmission of the data packet.

16. The receiver of claim 15, wherein delay budget is computed as $$t_n = t_{n-1} + \max(8 \ast s_{n-1}, \sigma)/R;$$

where $t_n$ is when an original data n can be sent and is determined by the time $t_{n-1}$ at which the original data packet n was sent, R is the data rate of a bottleneck link in bits per second, and size $s_{n-1}$ of the previous packet in bytes and $\sigma$ denotes waiting time required to avoid buffer overflow.

* * * * *

UNITED STATES PATENT AND TRADEMARK OFFICE
CERTIFICATE OF CORRECTION

| | |
|---|---|
| PATENT NO. | : 7,707,303 B2 |
| APPLICATION NO. | : 10/526807 |
| DATED | : April 27, 2010 |
| INVENTOR(S) | : Albers et al. |

It is certified that error appears in the above-identified patent and that said Letters Patent is hereby corrected as shown below:

In Column 11, Line 25, delete "DB+," and insert -- DB', --, therefor.

In Column 13, Line 60, in Claim 13, delete "times," and insert -- time, --, therefor.

Signed and Sealed this

Thirteenth Day of July, 2010

David J. Kappos
*Director of the United States Patent and Trademark Office*